United States Patent [19]
Tokutake

[11] Patent Number: 5,183,103
[45] Date of Patent: Feb. 2, 1993

[54] HEAT EXCHANGER

[75] Inventor: Toshinori Tokutake, Oyamashi, Japan

[73] Assignee: Showa Aluminum Kabushiki Kaisha, Japan

[21] Appl. No.: 782,984

[22] Filed: Oct. 28, 1991

[30] Foreign Application Priority Data

Oct. 31, 1990 [JP] Japan .................................. 2-295709

[51] Int. Cl.⁵ ............................................... F28F 9/00
[52] U.S. Cl. .................................... 165/167; 165/149; 180/68.4
[58] Field of Search .................. 165/67, 149; 180/68.4

[56] References Cited

U.S. PATENT DOCUMENTS

| | | | |
|---|---|---|---|
| 2,331,634 | 10/1943 | Stempel | 165/149 X |
| 4,569,390 | 2/1986 | Knowlton et al. | 165/149 |
| 5,069,275 | 12/1991 | Suzuki et al. | 165/67 |

FOREIGN PATENT DOCUMENTS

| | | | |
|---|---|---|---|
| 2304883 | 8/1974 | Fed. Rep. of Germany | 165/67 |
| 923703 | 4/1963 | United Kingdom | 165/149 |

*Primary Examiner*—Allen J. Flanigan

[57] ABSTRACT

A heat exchanger comprises a plurality of flat tubes, a pair of hollow headers connected to both ends of each of the flat tubes in fluid communication with them, and at least one fastener secured to the headers. The fastener comprises at least one self-retainable embracing portion capable of resiliently engaging the exterior of the header to keep the fastener in place prior to brazing the components of the exchanger together. The fastener can be temporarily connected, without the aid of any special tools, on a heat exchanger body before brazing with a "one-shot" procedure, thus rendering easy the manufacture of the heat exchanger. Since special tools are unnecessary, a greater number of temporarily assembled heat exchangers can be accommodated in one oven, thus improving, to a remarkable degree, the productivity in manufacture of the heat exchanger.

11 Claims, 4 Drawing Sheets

HEAT EXCHANGER

BACKGROUND OF THE INVENTION

1. Field of the Invention

The invention relates to a heat exchanger for use as a condenser in an automobile air conditioner or room air conditioner system, as an evaporator, oil cooler or the like.

2. Description of Prior Art

The so-called multi-flow type of heat exchanger is known and used as the condenser in an automobile air conditioner system. This heat exchanger comprises a plurality of flat tubes disposed in parallel with each other, and a plurality of fin members each interposed between two adjacent tubes, both ends of each tube are connected to hollow cylindrical headers in fluid communication with the headers.

The headers of those heat exchangers comprise certain fasteners which are used, for example, to mount the heat exchangers as the condensers of an air conditioner on the car body, or otherwise to connect accessories to the heat exchangers. It has been a common practice to temporarily fix the fasteners on outer peripheries of the headers at desirable portions. The fastners have been brazed, in an oven, to the headers so as to become integral with them.

The temporary fixing of the fasteners has, however, been troublesome and not easy to operate because certain specially designed tools or attachments must be used. When brazing the components or parts of each heat exchanger in the so-called "one-shot operation", such tools or attachments decrease the number of temporarily assembled heat exchangers which can be accommodated in the oven, and thus lower the productivity in manufacture of the heat exchangers.

OBJECTS AND SUMMARY OF THE INVENTION

In view of this drawback in the prior art, the present invention aims to provide a heat exchanger which does not need any special attachment to temporarily fix fasteners on headers of the heat exchanger, thereby improving the manufacture productivity of the exchangers.

Further objects and advantages of this invention will become clear in the embodiments which will be given hereinafter only by way of examples to demonstrate the preferred modes. Therefore, this invention is not limited to these embodiments, but permits many other modifications falling within the range and spirit of the invention.

A fastener as one constituent of a heat exchanger provided in the present invention comprises at least one embracing portion capable of being forced to fit on a header, when the fastener is urged towards a side surface of the header. Each embracing portion is self-retainable around the header portion which is gripped by the embracing portion. This self-retaining feature of the embracing portions, allows temporary connection of the fastener to the header so that the header and fastener may be brazed into one integral unit along with all the other constituents of the the heat exchanger in a so-called "one-shot" operation.

Thus, according to the invention, the heat exchanger comprises a plurality of flat tubes, a pair of hollow headers connected to both ends of each flat tube in fluid communication therewith, and at least one fastener secured to a header, and is characterized in that the fastener comprises at least one self-retainable embracing portion capable of being forced to fit on the header when the fastener is urged towards a side surface of the header, so that the embracing portion gripping the header is brazed to the header.

The fasteners having such self-retainable embracing portions can, without using any special tools or attachments, be temporarily fixed on the headers so stably that they are placed in the oven together with the main body of heat exchanger. In this way, the fasteners are brazed to the headers so as to become integral with them while they are embracing them. Consequently, the fasteners are secured to the header with enough strength to rigidly mount the heat exchanger, for example, on an automobile body.

THE PREFERRED EMBODIMENTS

Figure 1:
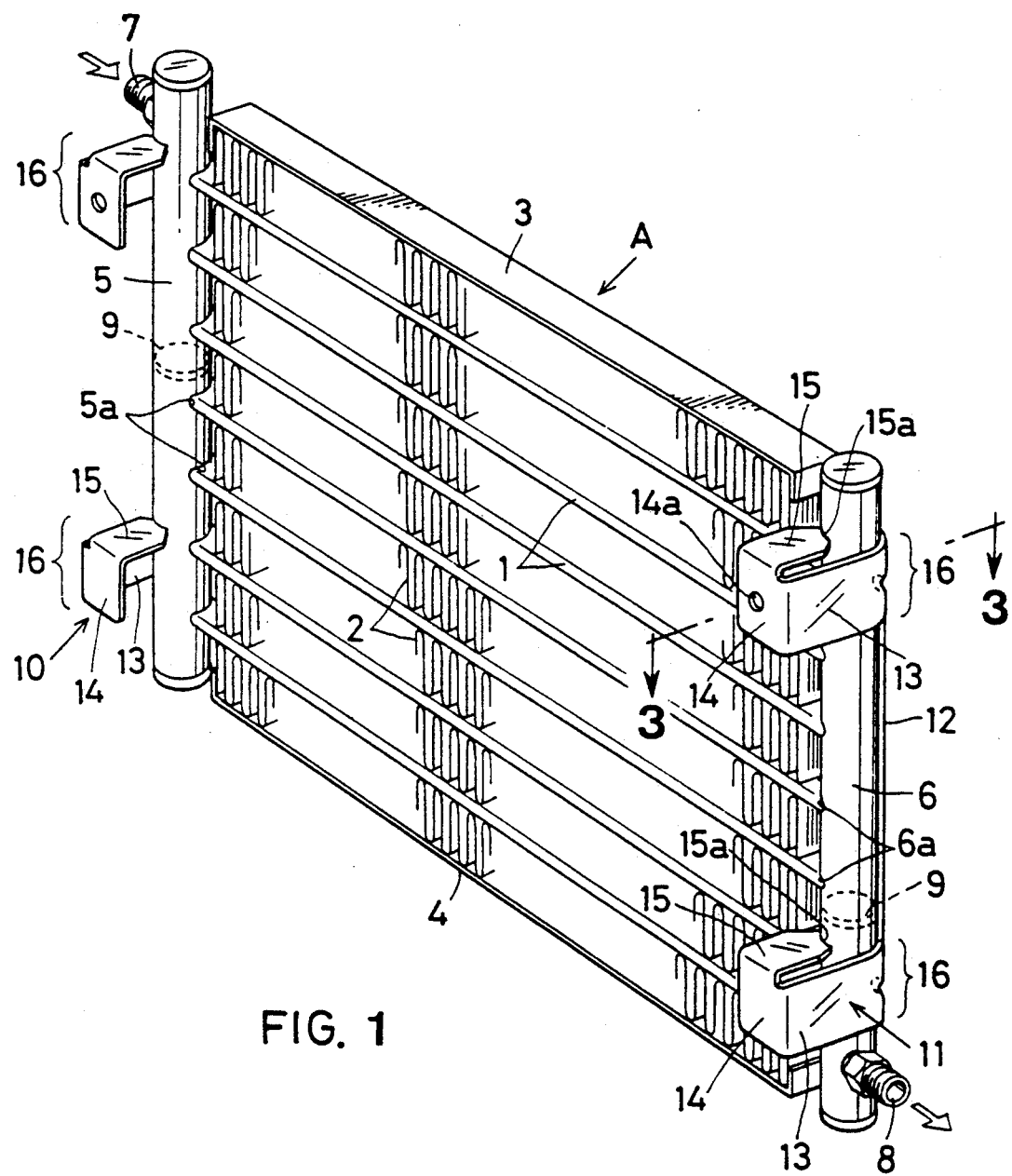
FIG. 1 is a perspective view, showing a heat exchanger provided in its entirety in an embodiment of the invention.

The present invention will now be described in detail by referring to the drawings which show its embodiments applied to a condenser for use in the car air conditioner system.

First Embodiment

In FIGS. 1 to 4, the reference symbol "A" denotes a heat exchanger body which comprises a plurality of flat and horizontal aluminum tubes 1 stacked one above another, a plurality of aluminum fin members 2 each interposed between two adjacent tubes 1 and 1, and a pair of left and right headers 5 and 6 which are disposed at opposite ends of the tubes and fin members.

The tubes 1 are made of an aluminum material into a flat, extruded profile. The so-called harmonica tube with a perforated shape may alternatively be used to provide such tubes 1.

Each fin member 2 is a corrugated fin which is repeatedly bent in a serpentine shape and is brazed to the adjacent tubes. It is preferable to employ fin members which have open louvers.

Brazed to the outermost corrugated fins 2 are aluminum side plates 3 and 4 respectively positioned outside the fins 2.

Each of the headers 5 and 6 is made of an aluminum and has a substantially circular cross section. Each hollow header 5 and 6 has a plurality of tube insertion apertures 5a or 6a. The ends of each tube 1 are inserted in the apertures of the opposite headers and liquid-tightly brazed to the headers. It is recommended that the headers 5 and 6 be made from a seam-welded pipe which in turn is manufactured from a brazing sheet with its inner and/or outer surfaces coated with a brazing agent. The fin members 2 may also be made of the brazing sheet so that the tubes 1, the fin members 2, the side plates 3 and 4 and the headers 5 and 6 may be integrally formed by the so-called "one-shot" brazing process within a vacuum heating oven. A higher productivity will be realized in using such a procedure.

The reference numeral 7 and 8 respectively denote a coolant inlet and a coolant outlet. The further numeral 9 denotes horizontal partitions tightly fixed in the headers so as to divide them into longitudinal chambers. A coolant flows into the heat exchanger body "A" through the inlet 7, and advances through coolant passageways within the heat exchanger body before flowing out of it. The coolant will exchange its heat with that of air, which is flowing through air paths formed between the tubes and fins. As a result of the heat exchange, the coolant will be condensed to become a liquid.

Fasteners 10 and 11 which are made of an aluminum alloy are secured to the left and right headers 5 and 6, respectively. They rigidly connect the heat exchanger body "A" to receiving members, for example, of an automobile body.

Since the fasteners 10 and 11 have the same structure, only the right fastener 11 will be described below with reference numerals which are also given to the corresponding portions of the left fastener 10.

Figure 2:
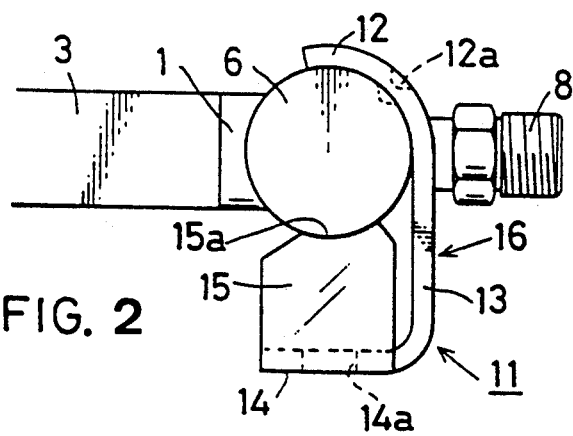
FIG. 2 is an enlarged plan view, showing a principal part of the heat exchanger.

As shown in FIGS. 1 and 2, the fastener comprises a concave contacting member 12 which extends a predetermined distance along the header 6 and is in contact with about a fourth of the outer periphery of the header. The fastener further comprises: extensions 13 protruding tangentially of the header from side edges of an upper and a lower portion of the concave contacting member; tabs 14 respectively extending from extremities of the extensions 13 and in parallel with the tubes 1; and ears 15 each protruding towards the header from and perpendicular to an upper edge of the tab 14.

Each ear 15 has intermediate its side edges, a tip end 15a which has a convex shape enabling a tight contact between the ear and a corresponding portion of the outer periphery of the header 6, as shown in FIG. 2. Another end extends from and slants to the tip end 15a so that the tip end can readily be snapped into its place. The concave contacting member 12 and the tip end 15a of the ear 15 assume a self-retaining position when they cooperate with each other to grip the header 6. Thus, the fastener 11 may be deemed to be composed of a pair of embracing portions 16 and a tie rod or beam connecting them together.

Figure 3:
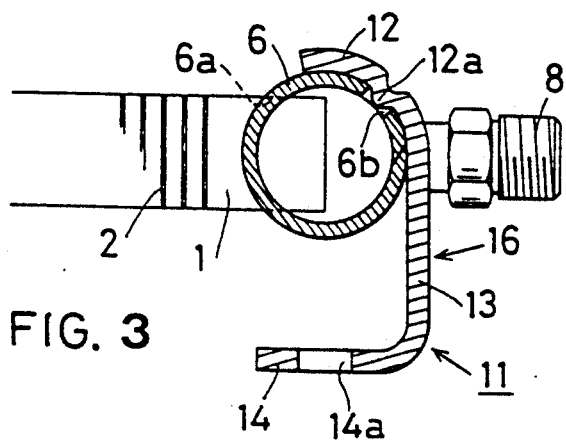
FIG. 3 is an enlarged cross section taken along the line 3—3 in FIG. 1.

One of the tabs 14 has a hole 14a formed through its central portion, and a bolt or the like may be inserted in the hole so as to fasten the heat exchanger to an automobile body or the like. Further, the concave contacting member 12 has a lug 12a protruding towards the header 6, as shown in FIG. 3. The header 6 has an opening 6b corresponding to and engageable with the lug so that the position of the fastener 11 can be readily and accurately controlled relative to the header by fitting the lug 12a in the opening 6b.

Figure 4:
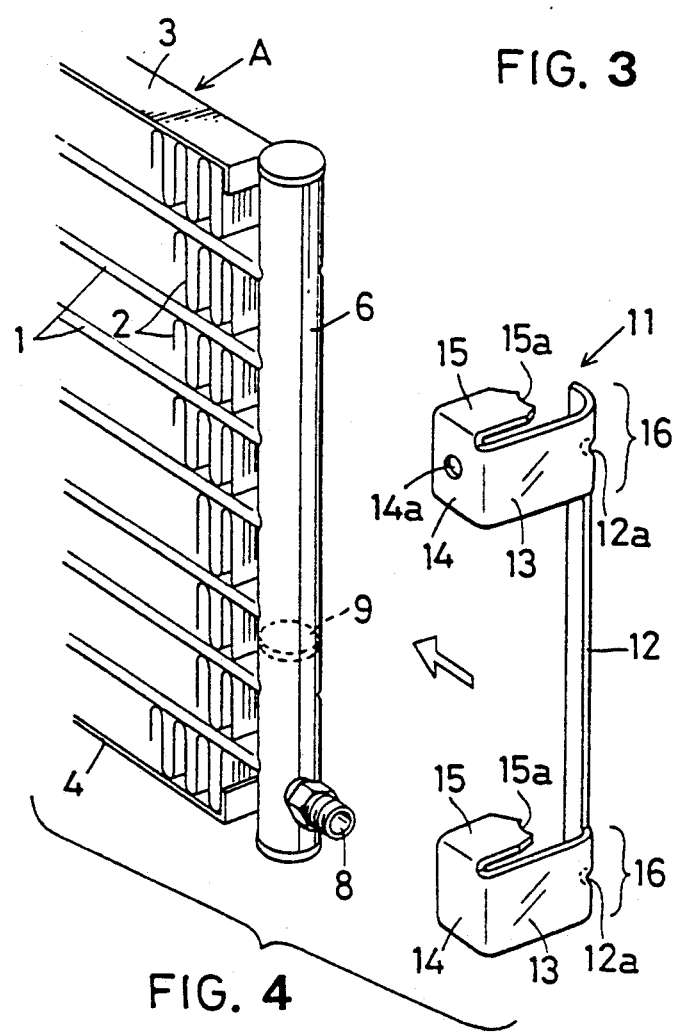
FIG. 4 is a perspective view, showing the heat exchanger with its fastener being separate from it before assembly.

As shown in FIG. 4, the attaching of the fastener 11 to the header 6 is carried out by forcibly urging the fastner 11 towards the header and thereby causing the header 6 to be grasped between the concave contacting member 12 and the tip ends 15a of the ears 15 and placing the lug 12a of said member 12 in the opening 6b of the header 6 to ensure the accurate position of the fastener 11 in self-retaining contact with the header.

The fasteners 10 and 11, disposed in self-retaining contact with the respective headers 5 and 6 without the aid of any auxiliary means, are then brought into an oven together with the heat exchanger body "A". All the abovementioned members are then brazed in their positions one to another to thereby provided a finished heat exchanger. The exchanger is then fixed to receiving members of, for example, the automobile body.

Second Embodiment

Figure 5:
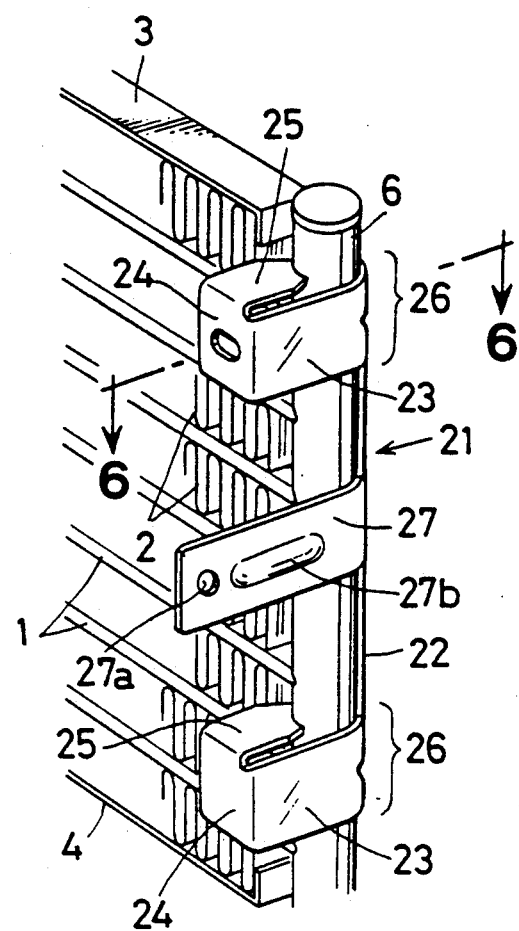
FIG. 5 is a perspective view, showing a principal part of a second embodiment as a modification of the first embodiment.
Figure 6:
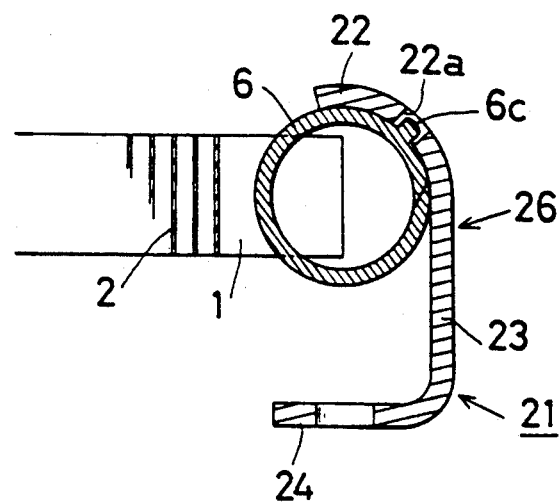
FIG. 6 is an enlarged cross section taken along the line 6—6 in FIG. 5.

FIG. 5 illustrates, in part, a second embodiment of the invention. A fastener 21, which is a pressed single piece of aluminum alloy, also comprises two embracing portions 26 similar to those of the first embodiment and disposed at an upper and lower ends of a concave contacting member 22. Each embracing portion 26 of the fastener is composed of an extension 23, a tab 24 and an ear 25. In this fastener 21, a connector 27 functions as a connecting means protrudes from a side edge of the contacting member 22 at the middle of the contacting member 22, and has a hole 27a for insertion of a bolt or the like. A bulging reinforcing rib 27b is formed integral with and along the connector 27, at its central portion. As shown in FIG. 6, the header 6 has a positioning lug 6c, while the contacting member 22 of the fastener 21 has an opening 22a corresponding to and engageable with the lug 6c. In the first embodiment the fastener includes the lug; and the header has the opening.

Third Embodiment

Figures 7, 8:
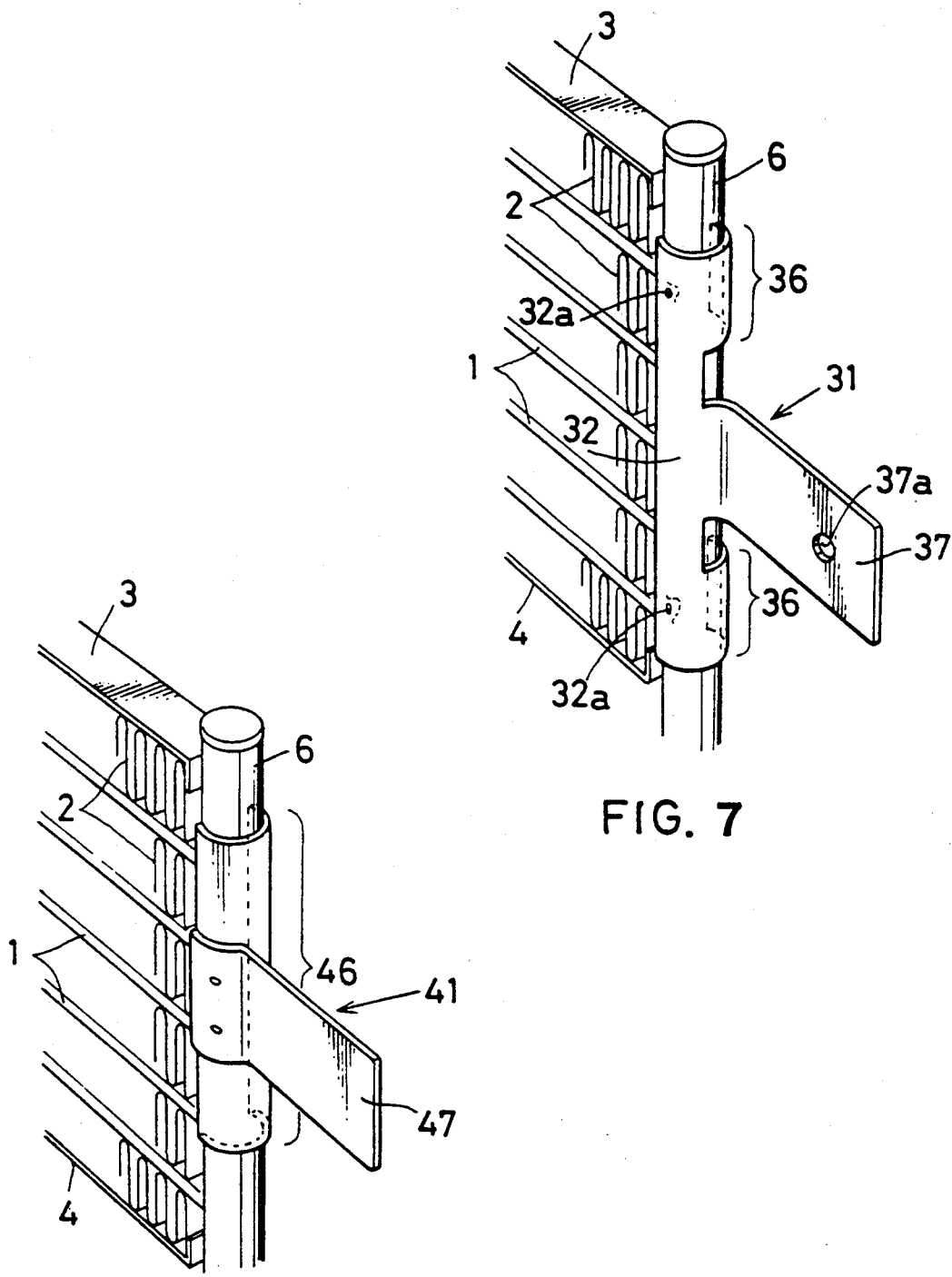
FIG. 7 is a perspective view, showing a principal part of a third embodiment as a further modification of the first embodiment.
FIG. 8 is another perspective view, showing a principal part of a still further modification.

FIG. 7 shows a fastener 31 in accordance with a third embodiment of the invention. The fastener 31, which is also an integral piece of pressed aluminum alloy, comprises a concave contacting member 32 of a given length, embracing portions 36 and 36, and a connecting means. The contacting member 32 is adapted to come into a tight contact with the header 6. The embracing portions 36 are capable of tightly holding the header 6 over a little more than a half periphery thereof. The connecting means is a connector 37 integral with and protruding from a portion of the contacting member 32 which lies between the embracing portions. A hole 37a for insertion of a bolt or the like is also formed through the connector 37. Similar to the first embodiment, this fastener 31 has a positioning lug 32a which protrudes inwards from the concave contacting member 32 into an opening 6b of the header to correctly position the fastener.

Fourth Embodiment

FIG. 8 shows a further embodiment of the invention, in which a fastener 41 comprises an embracing portion 46 adapted to tightly hold the header 6, over a little more than a half periphery and along a given adequate length of the header. A connector 47 serves as a connecting means and is spot-welded at its base end to a vertical middle zone of the embracing portion.

Although it is desirable as in the embodiments to form the positioning lug and hole in the fasteners and headers, these lug and hole can be dispensed with.

The invention may be applied also to a radiator or any other heat exchanger, though the embodiments relate to a condenser used in a car air conditioner system.

Any embracing structures other than those which have been described above may be employed insofar as the fastener can be forcibly fitted on the header so as to tightly embrace the header in the fastener and to thereby establish a self-retaining state.

In summary, the heat exchanger provided by the invention comprises the fastener which can be snapped to the side of header into the self-retaining and engaging state, so that the fastener is temporarily attached to the heat exchanger body, without any auxiliary means being used, before "one-shot" brazing in the oven. Thus, the manufacture of a heat exchanger is rendered much easier than in the prior art process. In addition, a disadvantage presented by auxiliary means, namely the requirement of a larger space within the oven, will be eliminated in the invention. Thus, a greater number of temporarily assembled heat exchangers can be accommodated in one oven, improving, to a remarkable degree, the productivity in manufacture of the heat exchanger.

Further, it is noted that the brazing process is effective to make permanent the self-retaining position of the embracing portion of the fastener. Therefore, the heat exchanger body can be secured, with sufficient strength, to, for example, the heat exchanger receiving portion of an automobile.

What is claimed is:

1. A heat exchanger comprising: a plurality of flat tubes; a pair of hollow headers connected to opposite ends of each flat tube in fluid communication with each tube; at least one fastener secured to a header; said fastener comprising a pair of embracing portions capable of resiliently engaging the exterior of the header to keep the fastener in place prior to brazing the components of the heat exchanger together and a tie rod connecting the embracing portions together.

2. A heat exchanger as defined in claim 1, wherein the fastener is an integral piece made by a conventional pressing technique.

3. A heat exchanger as defined in claim 1, wherein the fastener includes a connecting means protruding outwards from the tie rod, and wherein each embracing portion has a C-shape to engage a little more than a half of the outer periphery of the header.

4. A heat exchanger as defined in claim 3, wherein the fastener is an integral piece made by a conventional pressing technique.

5. A heat exchanger comprising: a plurality of flat tubes; a pair of hollow headers connected to opposite ends of each flat tube in fluid communication with each tube; at least one fastener secured to a header; said fastener comprising at least one embracing portion capable of resiliently engaging the exterior of the header to keep the fastener in place prior to brazing the components of the heat exchanger together, said embracing portion including a concave contacting member which extends along the header and contacts the exterior of the header; an extension protruding from a side edge of the concave contacting member; a tab integrally and perpendicularly extending from an extremity of the extension; and an ear protruding perpendicularly towards the header from an upper or lower edge of the tab, whereby a gap between the concave contacting member and a tip end of the ear receives the header.

6. A heat exchanger as defined in claim 5, wherein the tip end of the ear is of a concave shape which fits on the outer periphery of the header.

7. A heat exchanger as defined in claim 5, wherein the ear has a further edge continuing from and slanted to the tip end to face the header so that the tip end can readily be snapped into its place on the header.

8. A heat exchanger as defined in claim 5, wherein the tab has a hole formed therethrough to connect the tab to another article.

9. A heat exchanger as defined in claim 5, wherein the concave contacting member and the header respectively comprise positioning means effective to position the former relative to the latter.

10. A heat exchanger as defined in claim 9, wherein the positioning means are: a lug protruding towards the header from the concave contacting member; and a hole formed in the header to cooperate with the lug.

11. A heat exchanger as defined in claim 9, wherein the positioning means are: a hole formed through the concave contacting member; and a lug formed on the header to cooperate with the hole.

* * * * *